US012737399B2

(12) United States Patent
Chong et al.

(10) Patent No.: US 12,737,399 B2
(45) Date of Patent: Sep. 15, 2026

(54) SYSTEM AND METHODS FOR PROSPECTIVE LEGAL RESEARCH

(71) Applicant: Thomson Reuters Enterprise Centre GmbH, Zug (CH)

(72) Inventors: Henry Chong, Cambridge, MA (US); Johannes Schleith, London (GB); Nikolai Nefedov, Gattikon (CH); David Oliver, London (GB); Daniella Tsar, Orpington (GB)

(73) Assignee: Thomson Reuters Enterprise Centre GmbH, Zug (CH)

( * ) Notice: Subject to any disclaimer, the term of this patent is extended or adjusted under 35 U.S.C. 154(b) by 232 days.

(21) Appl. No.: 16/008,135

(22) Filed: Jun. 14, 2018

(65) Prior Publication Data

US 2018/0365317 A1 Dec. 20, 2018

Related U.S. Application Data

(60) Provisional application No. 62/519,230, filed on Jun. 14, 2017.

(51) Int. Cl.

| | |
|---|---|
| ***G06F 16/3332*** | (2025.01) |
| ***G06F 16/3329*** | (2025.01) |
| ***G06F 16/35*** | (2025.01) |
| ***G06F 16/838*** | (2019.01) |
| ***G06F 16/93*** | (2019.01) |
| ***G06F 16/9535*** | (2019.01) |
| ***G06Q 50/18*** | (2012.01) |

(52) U.S. Cl.

CPC ...... *G06F 16/3338* (2019.01); *G06F 16/3329* (2019.01); *G06F 16/35* (2019.01); *G06F 16/838* (2019.01); *G06F 16/93* (2019.01); *G06F 16/9535* (2019.01); *G06Q 50/18* (2013.01)

(58) Field of Classification Search

CPC .... G06F 16/3338; G06F 16/838; G06F 16/93; G06F 16/35; G06F 16/3329; G06F 16/9535; G06Q 50/18

See application file for complete search history.

(56) References Cited

U.S. PATENT DOCUMENTS

| | | | | |
|---|---|---|---|---|
| 8,831,945 | B2 * | 9/2014 | Arai | G06F 40/10<br>704/251 |
| 9,129,008 | B1 * | 9/2015 | Kuznetsov | G06F 16/435 |
| 2009/0193328 | A1 * | 7/2009 | Reis | G06F 16/345<br>715/231 |
| 2009/0259632 | A1 * | 10/2009 | Singh | G06F 16/957 |

(Continued)

*Primary Examiner* — Tony Wu

(57) ABSTRACT

The present invention is directed towards systems and methods for conducting prospective legal research, which comprises receiving an initiated user question at a graphical user interface comprising one or more search terms and performing query expansion on the received search query. One or more documents that are responsive to the expanded search query are then identified, and from the set of responsive documents, a subset of documents that reference future development are then identified. The one or more responsive documents that reference future development are grouped into one or more document clusters and a topic is identified for each of the one or more document clusters. The one or more document clusters and the associated topics are then presented at the graphical user interface.

19 Claims, 5 Drawing Sheets

(56) References Cited

U.S. PATENT DOCUMENTS

| | | | | |
|---|---|---|---|---|
| 2010/0161620 | A1* | 6/2010 | Lamere | G06F 16/636 707/E17.014 |
| 2013/0212192 | A1* | 8/2013 | Yerli | H04L 51/52 709/206 |
| 2013/0238584 | A1* | 9/2013 | Hendry | G06F 16/951 707/706 |
| 2013/0311500 | A1* | 11/2013 | Milone | G06F 16/21 707/758 |
| 2014/0006328 | A1* | 1/2014 | Blanco | G06F 16/95 706/46 |
| 2014/0122388 | A1* | 5/2014 | Bai | G06N 20/00 706/12 |
| 2014/0195519 | A1* | 7/2014 | Holt | G06F 16/3322 707/722 |
| 2015/0067471 | A1* | 3/2015 | Bhardwaj | G06F 16/5854 715/233 |
| 2015/0112963 | A1* | 4/2015 | Mojtahedi | G06F 16/9537 707/711 |
| 2015/0242493 | A1* | 8/2015 | Misra | G06F 16/3325 707/727 |

* cited by examiner

SYSTEM AND METHODS FOR PROSPECTIVE LEGAL RESEARCH

RELATED APPLICATION

This application claims priority to U.S. Provisional Application 62/519,230 filed on Jun. 14, 2017, the contents of which are incorporated herein in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright© 2018 Thomson Reuters.

TECHNICAL FIELD

This disclosure relates generally to performing respective legal research legal research. More specifically, the disclosure is directed towards systems and methods for conducting prospective legal research.

BACKGROUND

Traditionally, in order to conduct legal research on a particular subject, researchers were required to carefully craft search strategies and apply such strategies to existing court opinions, motions, briefs, transcripts, secondary sources such as treatises or articles, statutes, web pages, etc. While such processes returned relevant results that provided a plethora of information to legal researchers on the particular subject, such research would not necessarily allow for legal researcher to identify future trends and prospective critical issues regarding the particular subject. Accordingly, there exists a need for systems and methods that provides for prospective legal research, which identifies future relevant court opinions, motions, briefs, transcripts, secondary sources such as treatises or articles, statutes and web pages, which can subsequently be grouped according to relevant categories, and which in turn allows legal researchers to identify future trends and upcoming issues pertaining a legal topic.

SUMMARY

The present invention is directed towards systems and methods for conducting prospective legal research, which comprises receiving an initiated user question at a graphical user interface comprising one or more search terms and performing query expansion on the received search query. One or more documents that are responsive to the expanded search query are then identified, and from the set of responsive documents, a subset of documents that reference future development are then identified. The one or more responsive documents that reference future development are grouped into one or more document clusters and a topic is identified for each of the one or more document clusters. The one or more document clusters and the associated topics are then presented at the graphical user interface.

According to one embodiment of the present invention, identifying one or more responsive documents that reference future development further comprises determining whether one or more documents contains at least one of a future date, which comprises at least one of an explicit future date, a future date phrase and a future date range; a future term, which comprises at least one of a modal verb, a common prospective term and an uncommon prospective phrase; and a relevant feature, which comprises at least one of a prospective legal phrase, a rare phrase, an entity tags and a part of speech tags. According to another embodiment of the present invention, grouping the one or more responsive documents that reference future development into one or more document clusters is completed based on at least one of matching keywords, matching subjects, matching entities, matching unstructured text, matching authorship, matching quotes, matching dates, related dates, volume of documents, tagging relationships and direct connections between documents. According to one embodiment the method may include, presenting the one or more document clusters and the associated topics at the graphical user interface, wherein the graphic user interface includes therein a timeline depicting future dates relating to the at least one of the one or more response documents that reference future developments, including at least one solid interval and at least one fuzzy interval on the timeline each of the intervals corresponding to at least one of the explicit future date of the first of the plurality of responsive documents that reference future developments the future date phrase of the second of the plurality of responsive documents that reference future developments, and the future date range of the third of the plurality of responsive documents that reference future developments.

A system, as well as articles that include a machine readable medium storing machine-readable code for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

In general, the systems and methods described herein may relate to improvements to aspects of searching for information using a computer. These improvements not only improve the functioning of how such a computer (or any number of computers employed in the search) is able to operate to serve the user's research goals, but also improves the accuracy, efficiency and usefulness of the search results that are returned to the searcher.

The present system may be described in the context of information being comprised in "documents." In this sense, a document is simply a logical container for information. Examples of documents in the legal research field may include, for example, court opinions, motions, briefs, transcripts, secondary sources such as treatises or articles, statutes, web pages, etc. Documents may also comprise issue summaries or index headings rather than judicial opinions, briefs, secondary source chapters or other longer-format documents. For example, a document that is returned by the system may be a Westlaw Key Number, headnote or American Law Review ("ALR") article. It is also possible that one document may exist within another document—for example a book may be considered a document and also each chapter within that book may also be considered a document.

Figure 1:
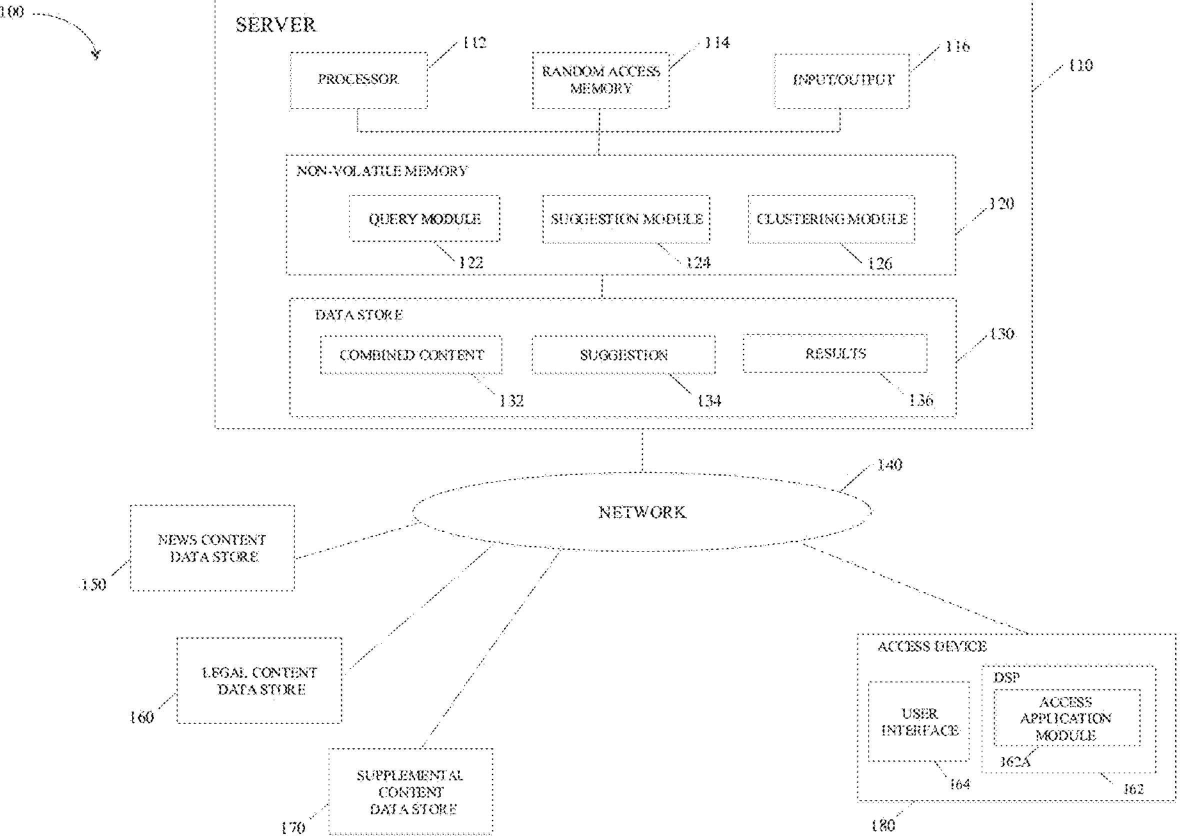
FIG. 1 is a schematic depicting an exemplary computer-based system for conducting prospective legal research.

Turning now to FIG. 1, an example of a suitable computing system 100 within which embodiments of the disclosure may be implemented is presented. The computing system 100 is only one example and is not intended to suggest any limitation as to the scope of use or functionality of the disclosure. Neither should the computing system 100 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, and other computer instructions known to those skilled in the art that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art may implement the description and figures as processor executable instructions, which may be written on any form of a computer readable media. In one embodiment, with reference to FIG. 1, the system 100 includes a server device 110 configured to include a processor 112, such as a central processing unit ("CPU"), random access memory ("RAM") 114, one or more input-output devices 116, such as a display device (not shown) and keyboard (not shown), non-volatile memory 120 and a data store 130, all of which are interconnected via a common bus and controlled by the processor 112.

Accordioning to one embodiment processor 112 is central processing unit ("CPU") that use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

As shown in the FIG. 1 example, in one embodiment, the non-volatile memory 120 is configured to include a query module 122, a suggestion module 124 and a clustering module 126. The query module 122 serves to receive the questions from the access device 180, signal the suggestion module 124 and the clustering module 126 to perform their respective functions, to execute the expanded query against the data store 130 and to return the search results from the data 130 responsive to the expanded query. A more detailed description as to how the query module 122 executes the expanded query will be discussed in the description of the processes outlined in FIGS. 2 through 4.

Accordioning to one embodiment, the suggestion module 124 is utilized to automatically suggest question components or segments, such as expanded words or phrases, suggested secondary or alternate words or phrases, related date terms and tagged entity terms, in response to a user initiated user question. The clustering module 126 serves to identify appropriate groups or clusters of the search results. Additional details of modules 122 through 126 are discussed in connection with FIGS. 2-4.

As shown in FIG. 1, in one embodiment, a network 140 is provided that can include various devices such as routers, server, and switching elements connected in an Intranet, Extranet or Internet configuration. Networks are commonly thought to comprise the interconnection and interoperation of access devices, servers, and intermediary nodes in a graph topology. It should be noted that an intermediary node includes a computer, other device, program, or combination thereof that facilitates, processes information and requests, and/or furthers the passage of information from a source user to a destination. Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

In one embodiment, the network 140 uses wired communications to transfer information between an access device 180, the server device 110, a news content data store 150, a legal content data store 160 and a supplemental content data store 170. In another embodiment, the network 140 employs wireless communication protocols to transfer information between the access device 180, the server device 110, the news content data store 150, the legal content data store 160 and the other content data store 170. For example, the network 140 may be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). The network 140 may also be a Wide Area Network (WAN), such as the Internet, which employs one or more transmission protocols, e.g. TCP/IP. As another example, the network 140 may employ a combination of digital cellular standards and transmission protocols. In yet other embodiments, the network 140 may employ a combination of wired and wireless technologies to transfer information between the access device 180, the server device 110, the news content data store 150, the legal content data store 160 and the supplemental content data store 170.

According to one embodiment, the news content data store 150 is a repository that maintains and stores new documents from one or more news organizations, such as REUTERS. In one embodiment, the legal content data store 160 is a repository of legal documents, such as WESTLAW that maintains court decisions, litigation dockets and filings, legal treatises, law review articles and annotations thereto. According to one embodiment, the supplemental content data store 170 is a representative repository of non-news and non-legal documents that are relevant to the search query are generally available on the accessible Internet.

In one embodiment, the data store 130 is a repository that maintains and stores information utilized by the before-mentioned modules 122 through 126. In one embodiment, the data store 130 is a relational database. In another embodiment, the data store 130 is a directory server, such as a Lightweight Directory Access Protocol ("LDAP"). In yet another embodiment, the data store 130 is an area of non-volatile memory 120 of the server device 110.

In one embodiment, as shown in the FIG. 1 example, the data store 130 includes a combined content data store 132, a suggestion data store 134 and a results data store 136. According to one embodiment, the combined content data store 132 is combined match database, such as an ELASTISEARCH® database, which comprises relevant content from multiple data stores, including for example, content from the news content data store 150, the news content data store 150, the legal content data store 160 and the other content data store 170. The suggestion data store 132 maintains a defined grammar and linguistic and data constraints encoded in the grammar used to generate suggested query components. The results data store 136 serves to maintain all algorithms used to generate search result clusters, as well as the search results clusters themselves.

Although the data store 130 shown in FIG. 1 is connected to the network 140, it will be appreciated by one skilled in the art that the data store 130 and/or any of the information shown therein, can be distributed across various servers and be accessible to the server 110 over the network 140; be coupled directly to the server 110; be configured as part of server 110 and interconnected to processor 112, RAM 114, the one or more input-output devices 116 and the non-volatile memory 120 via the common bus; or be configured in an area of non-volatile memory 120 of the server 110.

The access device 180, according to one embodiment, is a computing device comprising: a touch-sensitive graphical user interface ("GUI") 184, a digital signal processor ("DSP") 182 having an access application module that allows a user to access the server 110, access application module 182A, transient and persistent storage devices (not shown); an input/output subsystem (not shown); and a bus to provide a communications path between components comprising the general purpose or special purpose computer (not shown). According to one embodiment, access application module 182A is web-based and uses thin client applications (not shown), such as a web browser, which allows a user to access the server 110. Examples of web browsers are known in the art, and include well-known web browsers such as such as MICROSOFT® INTERNET EXPLORER®, GOOGLE CHROME™, MOZILLA FIREFOX® and APPLE® SAFARI®. According to another embodiment, access device 180 is a mobile electronic device having a GUI, a DSP having an access application module, internal and external storage components; a power management system; an audio component; audio input/output components; an image capture and process system; RF antenna; and a subscriber identification module (SIM) (not shown). Although system 100 is described generally herein as comprising a single access device 180, it should be appreciated that the present invention is not limited to solely two access devices. Indeed, system 100 can include multiple access devices.

Further, it should be noted that the system 100 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output of the system is communicated from the computing device to a display device, such as a computer monitor.

Figure 2:
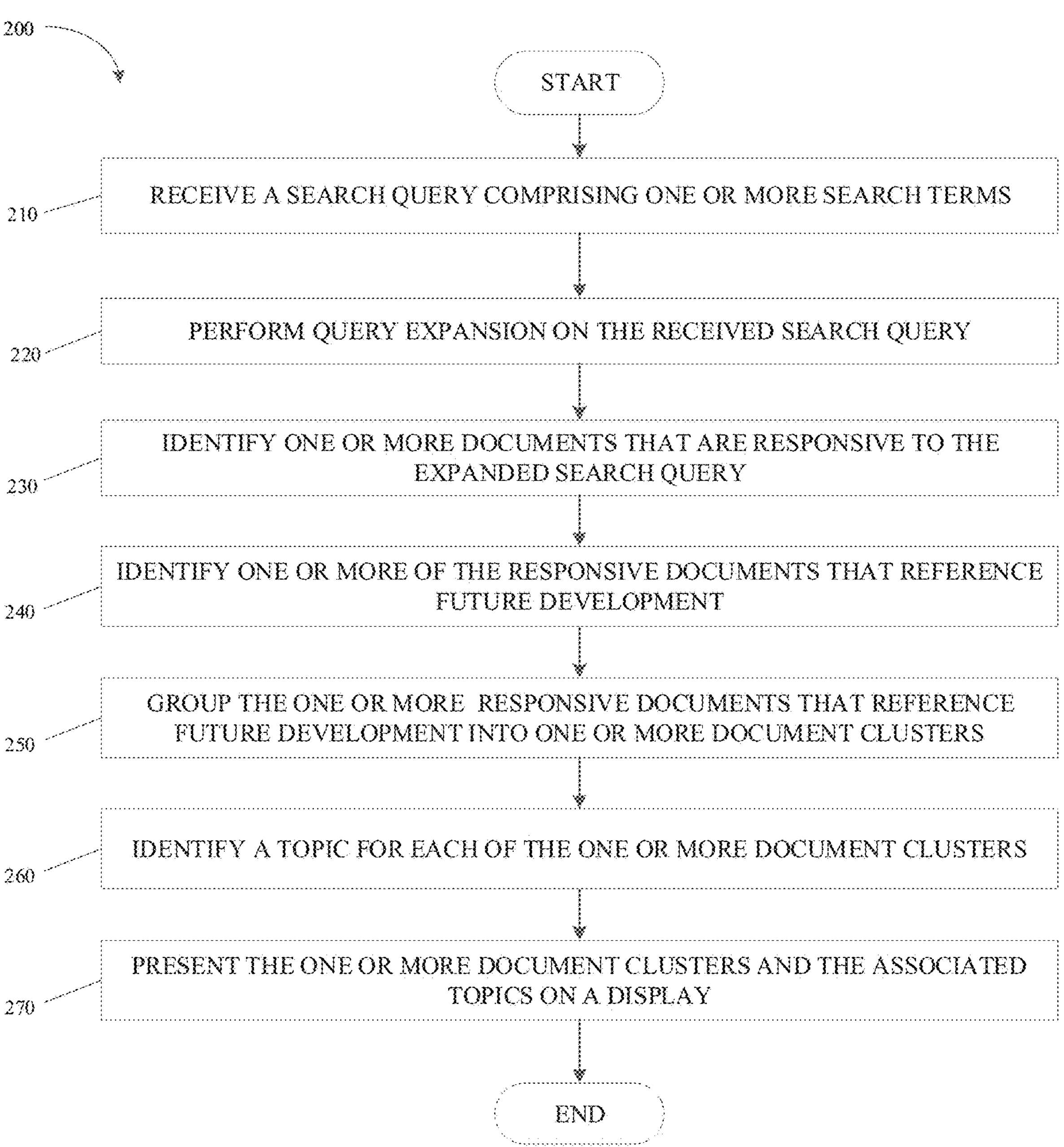
FIG. 2 is a flow diagram illustrating an exemplary computer-implemented method for conducting prospective legal research.

Turning now to FIG. 2, an exemplary method 200 for conducting prospective legal research is disclosed in the context of system 100 of FIG. 1. The exemplary method begins with the receipt of an initiated user search query comprising one or more search terms at the graphical user interface 164 of the access device 160, step 210. For example, a user is provided a graphical user interface that provides a field for the user to enter a question. In one embodiment, the user enters the question in natural language format. For example, a user may enter the search query comprising a single search term "drones."

Once entered, the search query initiated by the user is submitted to query module 122 over the network 140. The query module 122, upon receipt of the initiated user search query, signals the suggestion module 124 to perform one or more suggestion processes upon the received search query utilizing the defined grammar and linguistic and data constraints encoded in the grammar maintained in the suggestion data store 132, step 220. In one embodiment, a suggestion process may include expansion of the search query using well known techniques in the field, including but not limited to stemming techniques, tokenization, Word2Vec and term frequency-inverse document frequency (TF-IDF). Continuing from the previous example for the search query comprising the single search term "drones," stemming techniques may be used to expand search query to include the terms "drone" and "drones," and Word2Vec modeling can be used to generate the Word2Vec terms "remotely-piloted," "remotely-piloted-aircraft-systems," and "RPA" for expansion of the search query. Additionally, a suggestion process can also include the suggestion of secondary or alternate search terms by the suggestion module 124. Continuing from the previous example, search terms "Unmanned-aerial-vehicles" and "Unmanned-aerial-vehicle" are also included in the expanded search query.

Returning to FIG. 2, according to one embodiment, the expanded search query is executed by the query module 122 against one or more databases, such as the news content data store 150, the news content data store 150, the legal content data store 160 and the supplemental content data store 170, and one or more documents are identified that are responsive to the expanded search query, step 230. According to one embodiment, the one or more responsive documents are stored in the combined content data store 132, which for example can be an ELASTISEARCH® database.

At step 240, one or more of the responsive documents maintained in the combined content data store 132 are identified that reference future development by the query module 122. In one embodiment, documents that reference future development include documents that include future dates as compared to the publication date of the documents, as well as documents that include future indicative terms, such as modal verbs. Additional details regarding terms that reference future development are discussed in relation to FIG. 3.

Returning to FIG. 2, at step 250, the one or more responsive documents that reference future developments are grouped into one or more document clusters by the clustering module 126 and stored in the results data store 136. According to one embodiment, the clustering module 126 groups the responsive documents, according to a variety of factors including, but not limited to (i) matching keywords, (ii) matching subjects, (iii) matching entities, (iv) matching unstructured text, (v) use of TF-IDF to relate important terms, (vi) matching authorship, (vii) matching quotes, (viii) matching or related dates, (ix) volume of documents, (x) tagging relationships and (xi) direct connections/references between documents. For example, documents responsive to the search query "drones" that indicate future development are clustered according to matching person entities, e.g. responsive documents that includes the term "David Cameron," and according to matching company name entities, e.g. responsive documents that includes the term "Federal Aviation Administration," as illustrated in Tables 1 and 2, respectively.

TABLE 1

| TYPE | SEARCH_TOPIC | COUNT |
|---|---|---|
| David Cameron | drones | 147 |
| Barack Obama | drones | 87 |
| Mohammed Emwazi | drones | 66 |
| Michael Fallon | drones | 54 |

TABLE 2

| TYPE | SEARCH_TOPIC | COUNT |
|---|---|---|
| Amazon | drones | 201 |
| Facebook | drones | 60 |
| civil aviation authority | drones | 57 |
| Google | drones | 50 |
| YouTube | drones | 47 |
| British Airways | drones | 47 |
| BBC | drones | 44 |
| Airbus | drones | 42 |
| Twitter | drones | 28 |
| Reuters | drones | 26 |
| federal aviation administration | drones | 25 |
| MPS | drones | 23 |
| Boeing | drones | 22 |
| PRIME AIR | drones | 21 |

In one embodiment, the grouping in step 250 is performed according to a to a combination of the factors in conjunction with known clustering techniques, such as document similarity (cosine similarity) based on the unstructured text of each individual document.

At step 260, a topic for each of the one or more document clusters is identified by the clustering module 126 by the clustering module 126 and stored in the results data store 136. According to one embodiment, statistical modeling, such as latent Dirichlet allocation (LDA) statistical modeling, is used on the unstructured text of the individual documents to identify a relevant topic for each document cluster. For example, a subset of the responsive documents to the search term "drones" that indicate future development may be clustered on the basis that the subset of responsive documents contained the matching person entity, "David Cameron." Using LDA modeling, a topic for the subset of documents could is identified as "Government and European Focus" based on the statistical modeling performed on the unstructured text of each document. Table 3 illustrates the relevant unstructured text of each document used to generate the relevant topic of "Government and European Focus."

TABLE 3

| DOCUMENT NO. | PUBLICATION DATE | RELEVANT SENTENCE |
|---|---|---|
| 1 | 26/03/2015 | The Government believes there is an adequate legal and regulatory framework to deal with remotely piloted aircraft systems and small drones, and agrees with the Committee that education through a range of media portals will help the industry and operators, both commercial and leisure, understand their responsibilities in these areas. |

TABLE 3-continued

| DOCUMENT NO. | PUBLICATION DATE | RELEVANT SENTENCE |
|---|---|---|
| 2 | 05/03/2015 | A European Union Committee report examines the European Commissions proposals to make Europe a global leader in the drones, or remotely piloted aircraft systems (RPAS), industry. |
| 3 | 03/03/2016 | "This programme . . . will be based on a multi-role drone platform that could serve as a basis for future operational capacity after 2030," the statement said after a Franco-British summit. |
| 4 | 15/08/2014 | A European Commission consultation seeks views on the potential gains that could be brought by the use of remotely piloted aircraft systems (RPAS or civil drones) and the concerns that would need to be addressed by EU public intervention. |
| 5 | 04/08/2014 | The European Commission has proposed to set new standards to regulate the operations of civil drones (or "remotely piloted aircraft systems"). |
| 6 | 13/02/2015 | New regulations on drones proposed to reduce threat to airlines. |
| 7 | 19/06/2015 | Italy, France and Germany agreed in May to develop a European drone programme for reconnaissance and surveillance, seeking to inject momentum into a proposal first considered in 2013 to reduce reliance on U.S. and Israeli technology. |
| 8 | 21/12/2016 | A Department for Transport consultation seeks views on proposals to harness the positive benefits of drones for public and commercial services and the benefits to the UK economy. |

Figure 5:
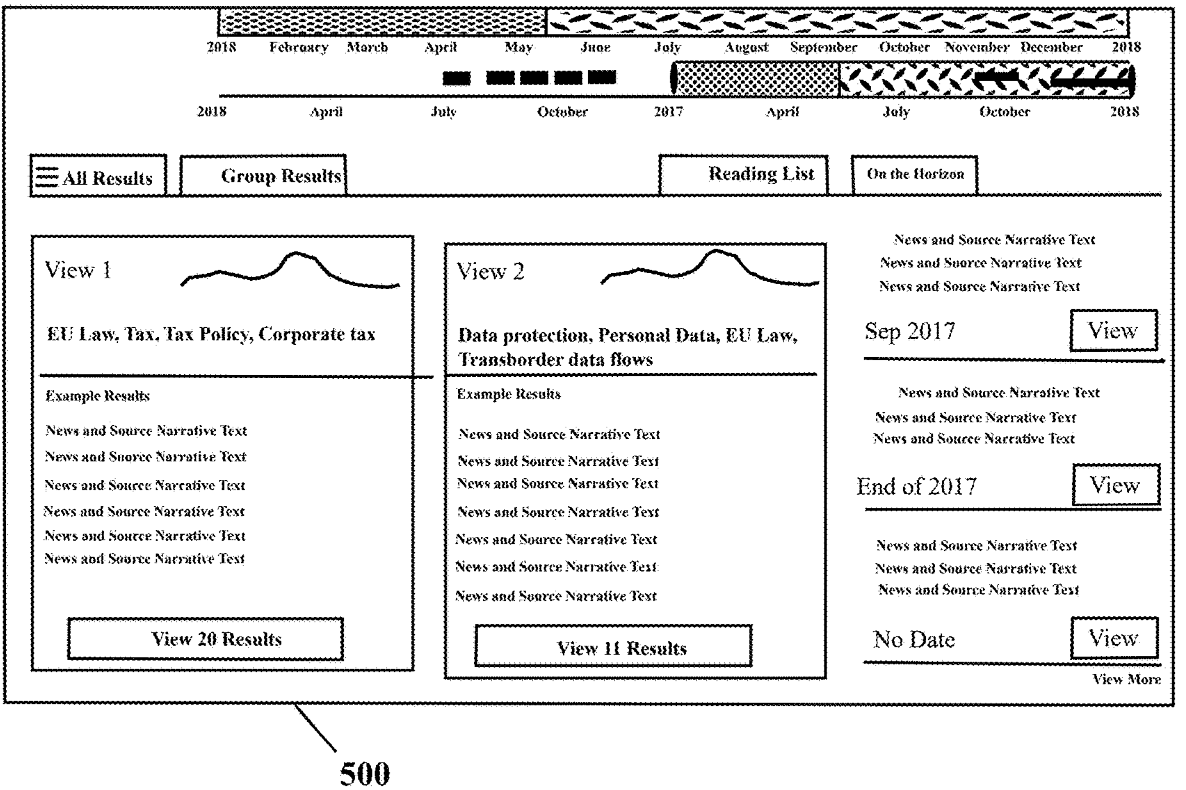
FIG. 5 is a is a screen diagram of an exemplary graphical representation relevant documents responsive to a prospective legal research query.

Returning to FIG. 2, the one or more document clusters and the associated topic for each of the one or more document clusters are presented on the user interface 164, step 270. FIG. 5 illustrates an exemplary view of the document cluster results 500.

Figure 3:
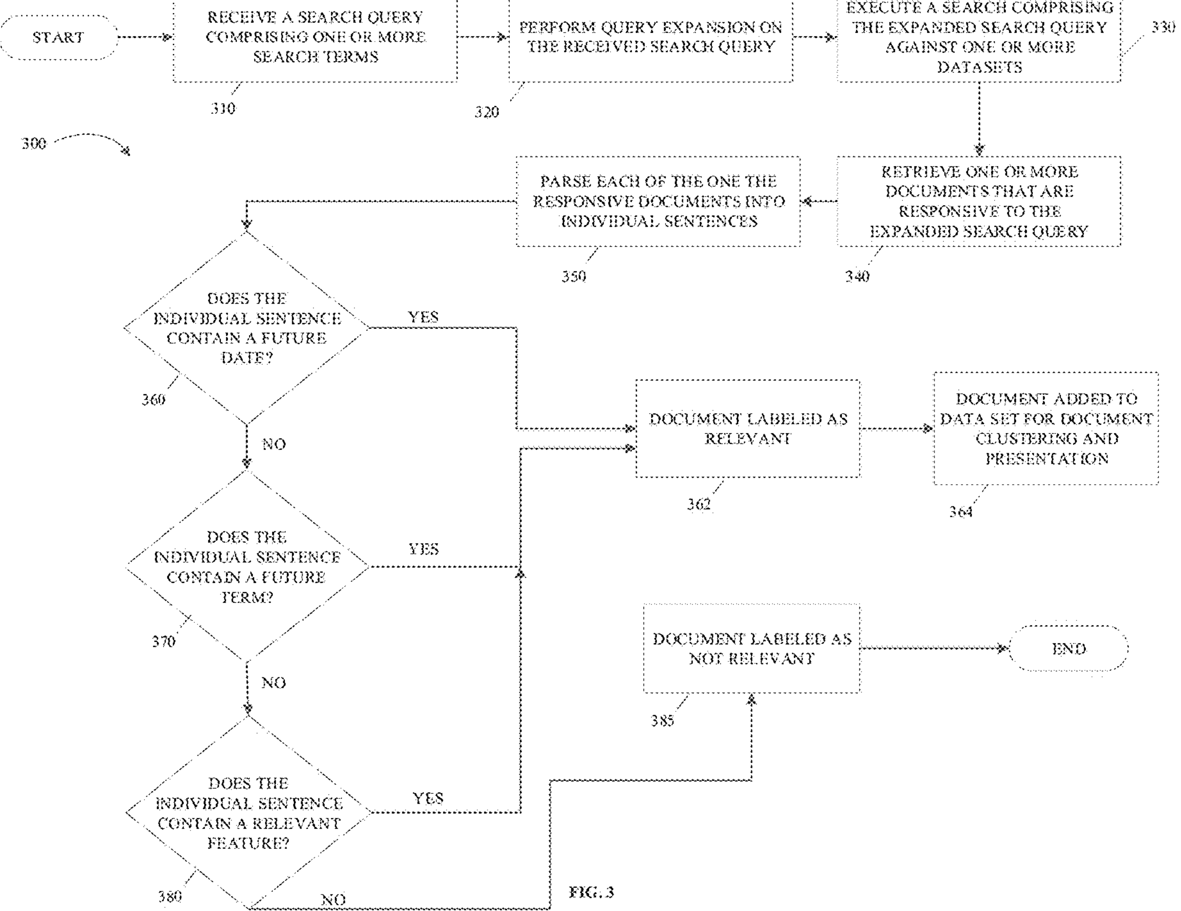
FIG. 3 is a flow diagram illustrating an exemplary computer-implemented method for identifying relevant documents responsive to a prospective legal research query.
Figure 4:
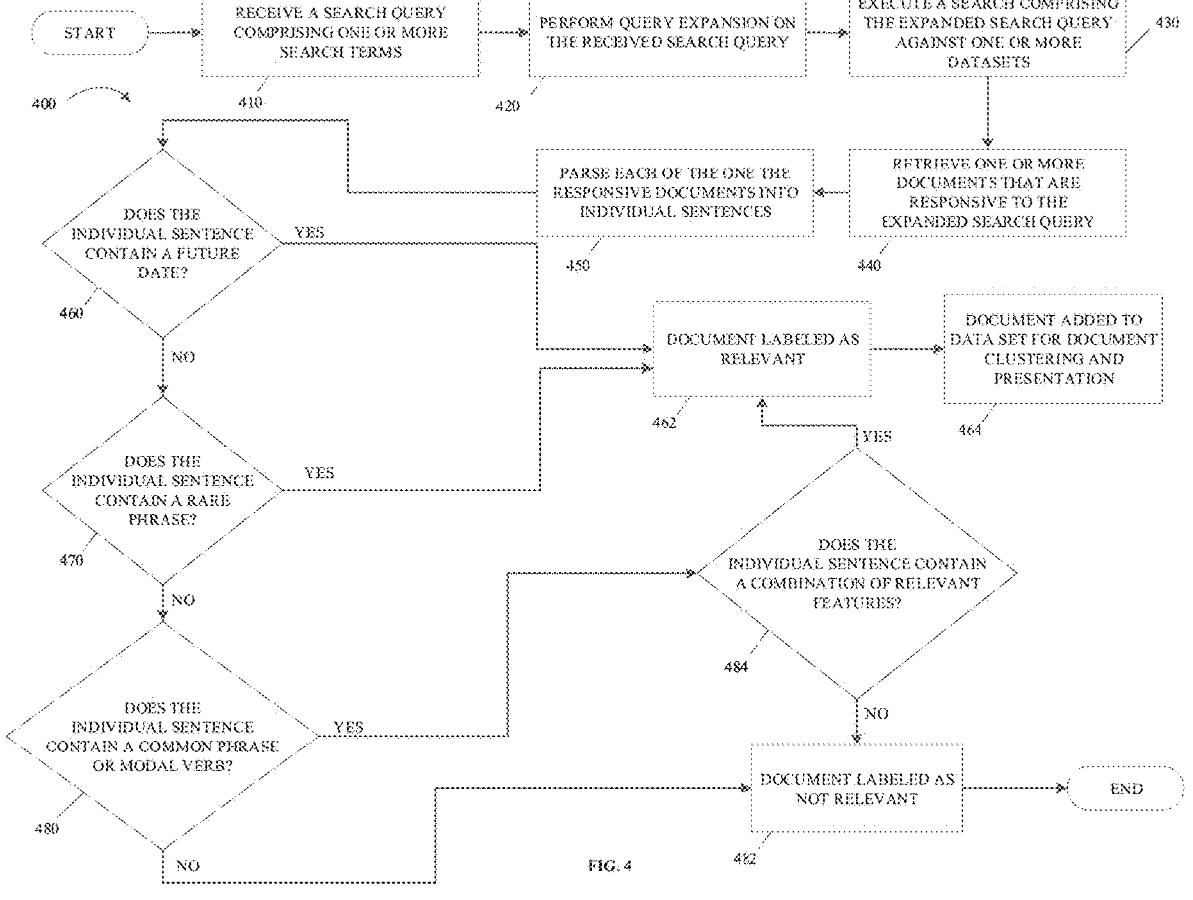
FIG. 4 is a flow diagram illustrating an exemplary computer-implemented method for identifying relevant documents responsive to a prospective legal research query.

Turning now to FIG. 3, a flow diagram illustrating an exemplary computer-implemented method for identifying relevant documents responsive to a prospective legal research query. The exemplary method begins with the receipt of an initiated user search query comprising one or more search terms at the graphical user interface 164 of the access device 160, step 310. For example, a user is provided a graphical user interface that provides a field for the user to enter a question. In one embodiment, the user enters the question in natural language format.

Once entered, the search query initiated by the user is submitted to query module 122 over the network 140. The query module 122, upon receipt of the initiated user search query, signals the suggestion module 124 to perform one or more suggestion processes upon the received search query, step 320. In one embodiment, the search query is expanded using well known techniques in the field as discussed in conjunction with FIG. 2.

At step 330, a search is executed by the query module 122 comprising the expanded search query against one or more data sets, such as the news content data store 150, the news content data store 150, the legal content data store 160 and the supplemental content data store 170. One or more documents that are responsive to the expanded search query are retrieved from the one or more datasets by the query module 122 and stored in the combined content data store 132. At step 350, each of the one or more responsive documents are parsed into individual sentences by the query module 122.

A determination is then made by the query module 122 as to whether the individual sentence contains a future date as compared to the publication date of the given document, step 360. This is the first step in determining whether a given document references future development. According to one embodiment, determination of whether the individual sentence contains a future date comprises identifying whether the individual sentence comprises (i) an explicit future date as compared to the publication date of the document, e.g. the parsed sentence includes the explicit date 2020 Oct. 20 in a news article from May 31, 2017; (ii) a future date phrase, e.g. "next month" or "following year" and (iii) a future date range, e.g. 2020-2030 in legislation text from 2015. As stated previously, the suggestion data store 134 maintains a listing of data constraints, which are directed in part to identifying explicit future dates, future date ranges and future date phrases.

Table 4 presented below illustrates an exemplary set of results from the subset of relevant document responsive to the search query "drones," which contains a future date.

TABLE 4

| DOC ID | DETERMINED FUTURE DATE | PUBLICATION DATE | SEARCH_TOPIC | SENTENCE |
|---|---|---|---|---|
| 1 | Jan. 1, 2017 | 30/12/2016 | drones | Domino's to launch drone delivery pizza in Australia next year - but warn airspace laws are |

TABLE 4-continued

| DOC ID | DETERMINED FUTURE DATE | PUBLICATION DATE | SEARCH_TOPIC | SENTENCE |
|---|---|---|---|---|
| | | | | too strict and could hinder the roll-out. |
| 2 | Jul. 7, 2017 | 13/02/2017 | drones | The driverless MEGADRONE big enough to carry a passenger could be flying around Dubai in July. |
| 3 | Sep. 14, 2015 | 09/09/2015 | drones | MPs' to examine secret evidence used to justify RAF Isil drone strike next week'. |

If yes, the document is labeled as relevant, step 362, and the document is added to the data set for document clustering and presentation stored in results data store 136, step 364.

If a determination is made that the individual sentence does not contain a future date, the process moves to step 370, where a determination is made as to whether the individual sentence contains a future term. According to one embodiment, determination of whether the individual sentence contains a future term comprises identifying whether the individual sentence contains (i) a modal verb, e.g. "could," "would, "should"; (ii) a common prospective term, e.g. "expect," or (iii) an uncommon prospective phrase, e.g. "prospect of," "seeks views," "to ban," "proposals to" and "new law." The suggestion data store 134 maintains a repository future terms that are utilized by the query module 122 in executing this determination.

What is claimed is:

1. A computer-implemented method for conducting prospective legal research comprising:

preprocessing a set of documents with a functional weighting scheme placing an increased weight on one or more documents within a recent time interval;

receiving an initiated user question at a graphical user interface comprising one or more search terms;

performing query expansion on the received search query;

identifying one or more documents from the set of preprocessed documents that are responsive to the expanded search query;

identifying a plurality of responsive documents that reference future development by determining whether the one or more responsive documents contains at least one of a future term and a relevant feature, wherein a relevant feature comprises at least one of a prospective legal phrase, a rare temporal phrase, an entity tag and a part of speech tag, wherein a first of the plurality of responsive documents that reference future development contains a future date comprising an explicit future date, a second of the plurality of responsive documents that reference future development contains a future date comprising a future date phrase and a third of the plurality of responsive documents that reference future development contains a future date comprising a future date range;

calculating a cosine similarity using term-frequency-inverse document frequency vectorization for the one or more responsive documents;

grouping, using the calculated cosine similarity, the one or more responsive documents that reference future development into one or more document clusters;

identifying a topic for each of the one or more document clusters from the calculated cosine similarity; and determining an optimal number of topics for latent Dirichlet allocation (LDA) modeling;

setting the optimal number of topics to between four and six for LDA modeling;

presenting the one or more document clusters and the associated topics at the graphical user interface, wherein the graphic user interface includes therein a timeline depicting future dates relating to the at least one of the one or more response documents that reference future developments, including at least one solid interval and at least one fuzzy interval on the timeline each of the intervals corresponding to at least one of the explicit future date of the first of the plurality of responsive documents that reference future developments the future date phrase of the second of the plurality of responsive documents that reference future developments, and the future date range of the third of the plurality of responsive documents that reference future developments.

2. The computer-implemented method of claim 1 wherein presenting at the graphical user interface includes presenting a representation of a similarity measure to a selected document.

3. The computer-implemented method of claim 1, comprising setting a maximum limit on a number of documents within the set of documents for preprocessing;

preprocessing the one or more responsive documents with natural language processing, wherein natural language processing includes stemming and punctuation removal;

performing LDA topic modelling on the one or more documents preprocessed with natural language processing; and selecting one or more dominant terms within each topic;

determining a strong weighting within the one or more documents after LDA topic modeling and wherein a future term comprises at least one of a modal verb, a common prospective term and an uncommon prospective phrase.

4. The computer-implemented method of claim 1 wherein grouping the one or more responsive documents that reference future development into one or more document clusters is completed based on at least one of matching keywords, matching subjects, matching entities, matching unstructured text, matching authorship, matching quotes, matching dates, related dates, volume of documents, tagging relationships and direct connections between documents.

5. The computer-implemented method of claim 1 wherein the timeline has a first range of dates and a scale having a second range of dates smaller than the first range of dates, the graphic user interface further including a second timeline having a start and end corresponding to the second range of dates.

6. The computer-implemented method of claim 2 wherein the representation of the similarity measure to the selected document is based on the calculated cosine similarity using term-frequency-inverse document frequency vectorization.

7. The computer-implemented method of claim 5 wherein the second timeline depicts the plurality of responsive documents that reference future developments sorted based on whether documents are official, unofficial, or legislative.

8. Non-computer readable media comprising program code stored thereon for execution by a programmable processor to perform a method for conducting prospective legal research comprising:

program code for preprocessing a set of documents with a functional weighting scheme placing an increased weight on one or more documents within a recent time interval;

program code for receiving an initiated user question at a graphical user interface comprising one or more search terms;

program code for performing query expansion on the received search query;

program code for identifying one or more documents that are responsive to the expanded search query;

program code for determining an optimal number of topics for latent Dirichlet allocation (LDA) modeling;

program code for setting the optimal number of topics to between four and six for LDA modeling;

program code for identifying a plurality of responsive documents that reference future development by determining whether the one or more responsive documents contains at least one of a future term and a relevant feature, wherein a relevant feature comprises at least one of a prospective legal phrase, a rare temporal phrase, an entity tag and a part of speech tag, wherein a first of the plurality of responsive documents that reference future development contains a future date comprising an explicit future date, a second of the plurality of responsive documents that reference future development contains a future date comprising a future date phrase, and a third of the plurality of responsive documents that reference future development contains a future date comprising a future date range;

program code for calculating a cosine similarity using term-frequency-inverse document frequency vectorization for the one or more responsive documents;

program code for grouping, using the calculated cosine similarity, the one or more responsive documents that reference future development into one or more document clusters;

program code for identifying a topic for each of the one or more document clusters from the calculated cosine similarity; and program code for presenting the one or more document clusters and the associated topics at the graphical user interface, wherein the graphic user interface includes therein a timeline depicting future dates relating to the at least one of the one or more response documents that reference future developments, including at least one solid interval and at least one fuzzy interval on the timeline, each of the intervals corresponding to at least one of the explicit future date of the first of the plurality of responsive documents that reference future developments the future date phrase of the second of the plurality of responsive documents that reference future developments, and the future date range of the third of the plurality of responsive documents that reference future developments.

9. The computer readable media of claim 8 wherein the program code for presenting at the graphical user interface further includes program code for presenting a representation of a similarity measure to a selected document.

10. The computer readable media of claim 8 further comprising program code for setting a maximum limit on a number of documents within the set of documents for preprocessing;

program code for preprocessing the one or more responsive documents with natural language processing, wherein natural language processing includes stemming and punctuation removal;

program code for performing LDA topic modelling on the one or more documents preprocessed with natural language processing; and program code for selecting one or more dominant terms within each topic;

program code for determining a strong weighting within the one or more documents after LDA topic modeling and wherein a future term comprises at least one of a modal verb, a common prospective term and an uncommon prospective phrase.

11. The computer readable media of claim 9 wherein the representation of the similarity measure to the selected document is based on the calculated cosine similarity using term-frequency-inverse document frequency vectorization.

12. The computer readable media of claim 9 wherein the program code for grouping the one or more responsive documents that reference future development into one or more document clusters is completed based on at least one of matching keywords, matching subjects, matching entities, matching unstructured text, matching authorship, matching quotes, matching dates, related dates, volume of documents, tagging relationships and direct connections between documents.

13. A system for conducting prospective legal research comprising:

a server including a processor configured to:

preprocess a set of documents with a functional weighting scheme placing an increased weight on one or more documents within a recent time interval;

receive an initiated user question at a graphical user interface comprising one or more search terms;

perform query expansion on the received search query;

identify one or more documents that are responsive to the expanded search query;

determine an optimal number of topics for latent Dirichlet allocation (LDA) modeling;

set the optimal number of topics to between four and six for LDA modeling;

identify a plurality of responsive documents that reference future development by determining whether the one or more responsive documents contains at least one of a future term and a relevant feature, wherein a relevant feature comprises at least one of a prospective legal phrase, a rare temporal phrase, an entity tag and a part of speech tag, wherein a first of the plurality of responsive documents that reference future development contains a future date comprising an explicit future date, a second of the plurality of responsive documents that reference future development contains a future date comprising a future date phrase, and a third of the plurality of responsive documents that reference future development contains a future date comprising a future date range;

calculate a cosine similarity using term-frequency-inverse document frequency vectorization for the one or more responsive documents;

group, using the calculated cosine similarity, the one or more responsive documents that reference future development into one or more document clusters;

identify a topic for each of the one or more document clusters from the calculated cosine similarity; and present the one or more document clusters and the associated topics at the graphical user interface, wherein the graphic user interface includes therein a timeline depicting future dates relating to the at least one of the one or more response documents that reference future developments, including at least one solid interval and at least one fuzzy interval on the timeline, each of the intervals corresponding to at least one of the explicit future date of the first of the plurality of responsive documents that reference future developments the future date phrase of the second of the plurality of responsive documents that reference future developments, and the future date range of the third of the plurality of responsive documents that reference future developments.

14. The system of claim 13 wherein the server including the processor is further configured to present at the graphical user interface a representation of a similarity measure to a selected document.

15. The system of claim 13 wherein the server including the processor is further configured to set a maximum limit on a number of documents within the set of documents for preprocessing;

preprocess the one or more responsive documents with natural language processing, wherein natural language processing includes stemming and punctuation removal;

perform LDA topic modelling on the one or more documents preprocessed with natural language processing; and select one or more dominant terms within each topic;

determine a strong weighting within the one or more documents after LDA topic modeling and wherein a future term comprises at least one of a modal verb, a common prospective term and an uncommon prospective phrase.

16. The system of claim 13 wherein grouping the one or more responsive documents that reference future development into one or more document clusters is completed based on at least one of matching keywords, matching subjects, matching entities, matching unstructured text, matching authorship, matching quotes, matching dates, related dates, volume of documents, tagging relationships and direct connections between documents.

17. The system of claim 13 wherein the timeline has a first range of dates and a scale having a second range of dates smaller than the first range of dates, the graphic user interface further including a second timeline having a start and end corresponding to the second range of dates.

18. The system of claim 14 wherein the representation of the similarity measure to the selected document is based on the calculated cosine similarity using term-frequency-inverse document frequency vectorization.

19. The system of claim 17 wherein the second timeline depicts the plurality of responsive documents that reference future developments sorted based on whether documents are official, unofficial, or legislative.

* * * * *